Feb. 6, 1923. 1,443,972
G. BOWDEN.
SAFETY ATTACHMENT FOR AUTOMOBILE AXLE JOINTS.
FILED APR. 12, 1922.
2 SHEETS-SHEET 1
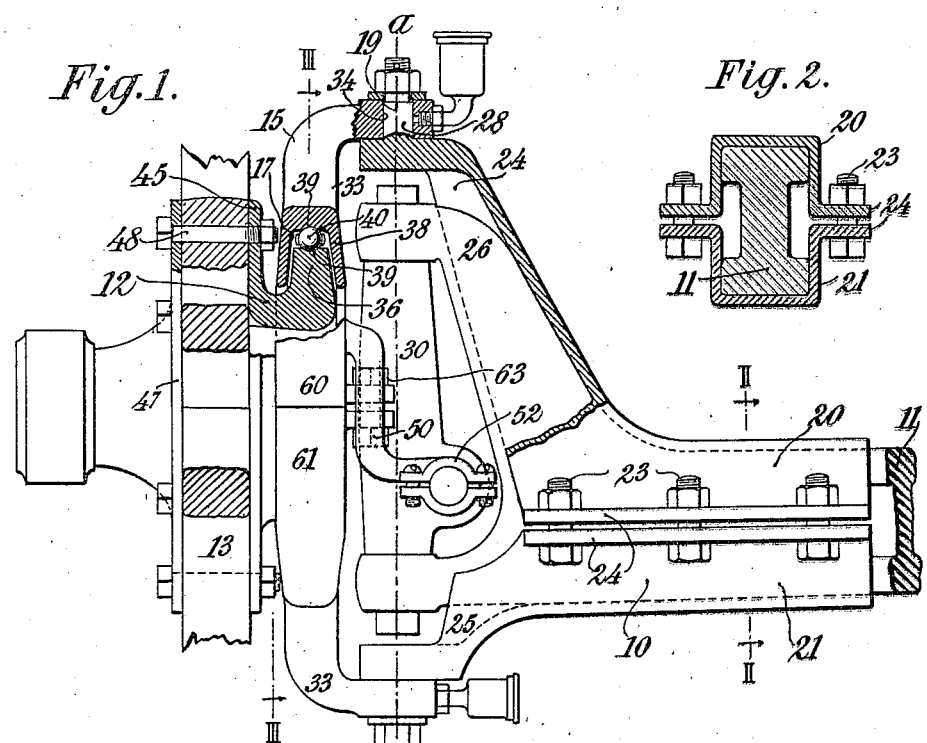
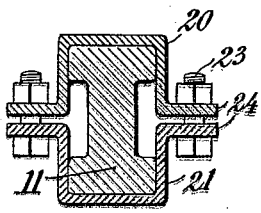
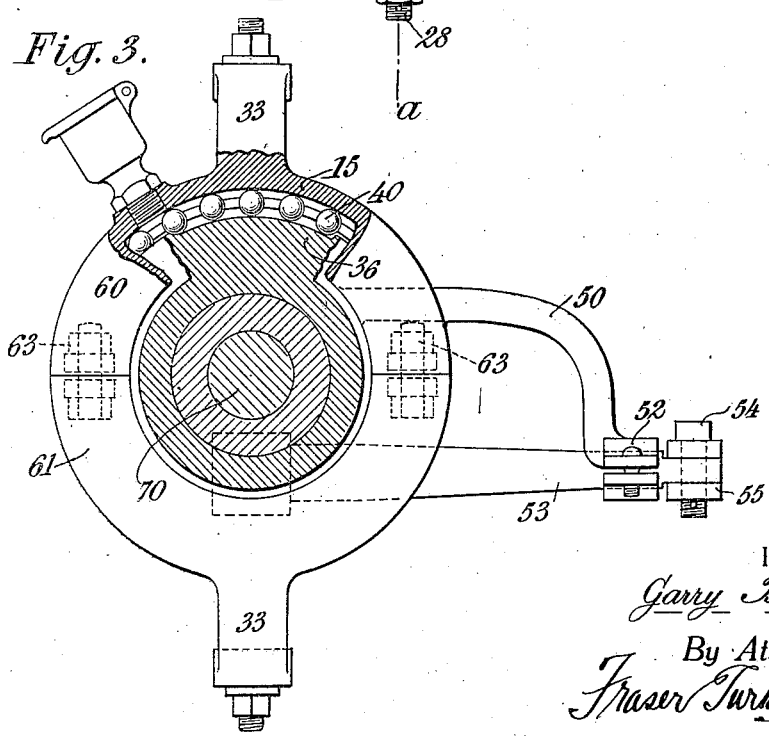
INVENTOR:
Garry Bowden,
By Attorneys,
Fraser Turk & Myers

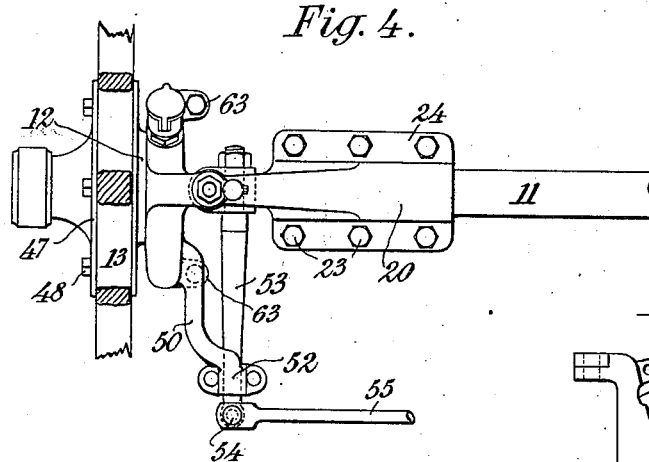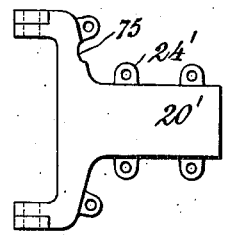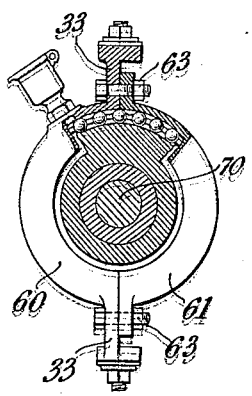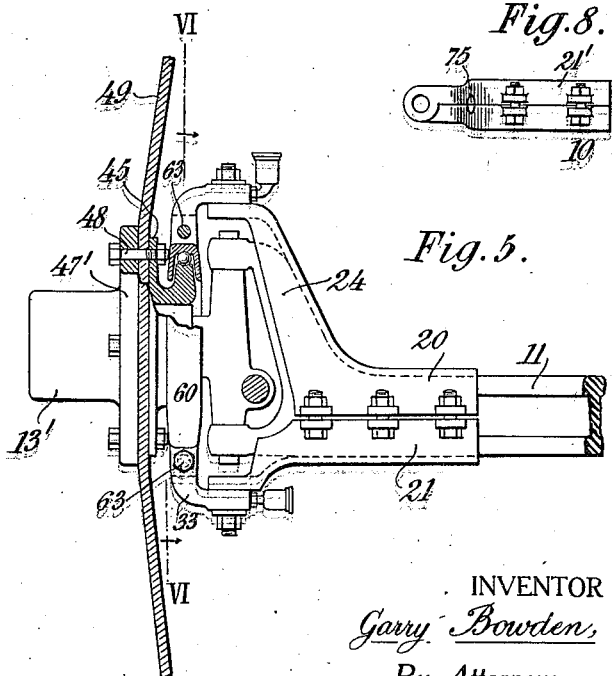

Patented Feb. 6, 1923.

1,443,972

UNITED STATES PATENT OFFICE.

GARRY BOWDEN, OF NEW YORK, N. Y.

SAFETY ATTACHMENT FOR AUTOMOBILE AXLE JOINTS.

Application filed April 12, 1922. Serial No. 551,923.

*To all whom it may concern:*

Be it known that I, GARRY BOWDEN, a citizen of the United States of America, residing at Number 1619 Metropolitan Avenue, Maspeth, in the borough of Queens, city and State of New York, have invented certain new and useful Improvements in Safety Attachments for Automobile Axle Joints, of which the following is a specification.

This invention relates to a safety attachment for an automobile axle joint, and provides improvements therein.

Experience has shown that many accidents of a serious nature are due to a break in the steering knuckle joint, or the steering arm which is attached to the steering knuckle.

The present invention is designed to avoid, to a very large extent, accidents or breakage occurring in the axle joints of automobiles, as explained above.

The invention further provides a device of the character described, which may be readily applied to automobiles without requiring alterations in existing constructions, and which may be made and sold at a reasonable price; and which further admits of ready removal of the wheels, either of the ordinary type in which the spokes and hub are assembled as a unit, or of the disc or wire wheel type wherein the hub is ordinarily separable from the remainder of the wheel.

Two embodiments of the invention are illustrated in the accompanying drawings, wherein:—

Figure 1 is a view, partly in elevation and partly in section, of so much of an axle, steering knuckle and wheel as is necessary to illustrate the invention, and showing the safety attachment of the present invention applied thereto.

Fig. 2 is a sectional view on the line II—II, Fig. 1.

Fig. 3 is a sectional view on the line III—III, Fig. 1.

Fig. 4 is a top plan view of the part shown in Fig. 1, on a reduced scale.

Fig. 5 is a view similar to Fig. 1, illustrating a second embodiment of the invention, and shown as applied to a disc wheel.

Fig. 6 is a sectional view on the line VI—VII, Fig. 5.

Figs. 7 and 8 are, respectively, a side elevation and a top plan view of another form of the axle-attached portion, which is necessary in certain types of automobiles.

Referring to said drawings, numeral 10 designates a part adapted to be attached to the axle 11 of an automobile. 12 designates a rotatable part adapted to be connected in any suitable manner to the wheel 13, and 15 designates a part intermediate said rotatable part 12 and the axle attached part 10, having a rotatable connection 17 to said rotatable part 12, and a pivotal connection 19 to said axle attached part 10.

The axle attached part 10 is conveniently made in two channeled portions 20, 21, clamped together over the axle 11 by bolts or the like 23, passing through flanges 24 on said parts 20, 21.

The part 10 is also preferably formed with arms 24, 25 fitting over the yoke 26 of the axle, and having pivots or the like 28 in line with the axis $a$ $a$ of the steering knuckle 30. The intermediate part 15 conveniently has arms 33 meeting the yoke portions 24, 25, and connected to the pins 28 by means of eyes 34. By these means the intermediate part is able to turn around the axis $a$ $a$ of the steering knuckle freely with the latter.

The joint 17 between the intermediate part 15 and the rotatable part 12 is conveniently in the form of a flange and channel, the flange 36 being conveniently formed on the part 12 and the channel 38 being conveniently formed on the intermediate part 15. The meeting faces of the flange 36 and channeled portion 38 are conveniently case-hardened, and tracks 39 formed therein, and antifriction devices such as balls 40 placed therein.

The rotatable part 12 is conveniently formed with a flat flange 45 or the like, which is attached, in any suitable manner, to the wheel 13. As shown in Fig. 1, the flange 45 is bolted directly to the hub 47 by means of bolts 48 or the like. As shown in Fig. 5, the flange 45 conveniently clamps between it and a flange 47′ on the hub 13′, by means of bolts 48 or the like, the web 49 of a disc wheel.

The intermediate part is preferably formed with an arm 50 provided with a clamp 52, adapted to be clamped to a part of the steering mechanism, conveniently to the steering arm 53 close to its point of connection 54 to the reach rod 55. In case of accident to the steering knuckle or the steering arm 53, the steering of the automobile would still be possible through the arm 50.

The parts 12 and 15 are conveniently assembled by making the intermediate part 15 in two portions, 60, 61, these parts 60, 61 being held together by any suitable means as by means of the bolts 63.

In case of disc wheels, where the disc and rim are ordinarily removed in changing a tire, the parts 60, 61 of the intermediate part 15 are preferably so constructed as to admit of ready separation of the said part 15 from the rotary part 10. As shown in Fig. 6, the joint between the parts 60, 61 is conveniently formed at one side of the arms 33. When the bolts 63 are removed, the part 61 may be removed, and the part 60 is swung around the axis $a\ a$ to disengage the flange 36. The hub 13, carrying with it the rotary part 45, may move off of the spindle 70 without interference.

When the attachment is in place on the automobile, a break or disengagement of the parts of the steering knuckle may take place without the automobile being rendered unusable. The wheel will be supported by the rotary part 12, the intermediate part 15 and the axle attached part 10, and the wheel may be steered through the arm 50 on the intermediate part 15; and it may turn on the pivots 19 in line with the axis $a\ a$ of the steering knuckle.

In certain types of automobiles the axle-attached part 10 shown in Figs. 1—6 inclusive would interfere with a part of the steering mechanism, in which case the axle-attached part may be made in two portions 20', 20', as shown in Figs. 7 and 8, the two parts being preferably channeled similarly to the parts 20, 21, but meeting along a plane running vertically through the axle, and having flanges 24' for receiving the bolts 23 or the like for clamping the said parts to the axle. An opening 75 may be provided for a steering arm which extends from a steering knuckle parallel to the axle.

What is claimed is:

1. A safety attachment for automobile axle joints comprising a part adapted to be connected to an axle, and means for connecting said axle-attached part to a wheel-part turning on the axle spindle, comprising a rotatable part and an intermediate part rotatably connected to said rotatable part and pivotally connected to said axle-attached part.

2. A safety attachment for automobile axle joints comprising a part adapted to be connected to an axle, and means for connecting said axle-attached part to a wheel-part turning on the axle spindle, comprising a rotatable part and an intermediate part rotatably connected to said rotatable part and pivotally connected to said axle-attached part, said intermediate part and said rotatable part being detachably connected.

3. A safety attachment for automobile axle joints comprising a part adapted to be connected to an axle, and means for connecting said axle-attached part to a wheel-part turning on the axle spindle, comprising a rotatable part and an intermediate part rotatably connected to said rotatable part and pivotally connected to said axle-attached part, said intermediate part being made in detachable parts permitting of connection and disconnection to said rotatable part.

4. A safety attachment for automobile axle joints comprising a part adapted to be connected to an axle, and means for connecting said axle-attached part to a wheel-part turning on the axle spindle, comprising a rotatable part and an intermediate part rotatably connected to said rotatable part and pivotally connected to said axle-attached part, said intermediate part having a steering arm attached thereto.

5. A safety attachment for automobile axle joints comprising a part adapted to be connected to an axle, and means for connecting said axle-attached part to a wheel-part turning on the axle spindle, comprising a rotatable part and an intermediate part rotatably connected to said rotatable part and pivotally connected to said axle-attached part, said axle-attached portion having a yoke corresponding to the axle yoke, and said intermediate part being pivoted to said yoke on an axis coincident with the axis of the steering knuckle.

In witness whereof, I have hereunto signed my name.

GARRY BOWDEN.